United States Patent
Hugl et al.

(10) Patent No.: US 8,396,158 B2
(45) Date of Patent: Mar. 12, 2013

(54) DATA PROCESSING METHOD, DATA TRANSMISSION METHOD, DATA RECEPTION METHOD, APPARATUS, CODEBOOK, COMPUTER PROGRAM PRODUCT, COMPUTER PROGRAM DISTRIBUTION MEDIUM

(75) Inventors: Klaus Hugl, Helsinki (FI); Olav Tirkkonen, Helsinki (FI); Yong Teng, Beijing (CN)

(73) Assignee: Nokia Corporation, Espoo (FI)

( * ) Notice: Subject to any disclaimer, the term of this patent is extended or adjusted under 35 U.S.C. 154(b) by 1437 days.

(21) Appl. No.: 11/486,856

(22) Filed: Jul. 14, 2006

(65) Prior Publication Data

US 2008/0013644 A1 Jan. 17, 2008

(51) Int. Cl.
*H04L 27/00* (2006.01)

(52) U.S. Cl. ........ 375/295; 375/260; 375/267; 375/299; 375/347; 375/349; 455/101; 455/102; 455/103; 455/115.1; 455/115.4; 455/132; 455/134

(58) Field of Classification Search .................. 375/260, 375/262, 349, 267, 295, 299, 347; 455/108, 455/115.3, 60, 101–103, 115.1–115.4, 132, 455/134

See application file for complete search history.

(56) References Cited

U.S. PATENT DOCUMENTS

| | | | |
|---|---|---|---|
| 7,139,328 B2 * | 11/2006 | Thomas et al. ............... | 375/299 |
| 7,778,826 B2 * | 8/2010 | Lin et al. ........................ | 704/223 |
| 7,881,674 B2 * | 2/2011 | Sugar et al. ..................... | 455/69 |
| 7,933,560 B2 * | 4/2011 | Han et al. ........................ | 455/69 |
| 2002/0009156 A1 * | 1/2002 | Hottinen et al. ............... | 375/267 |
| 2003/0128160 A1 * | 7/2003 | Sim .............................. | 342/382 |
| 2004/0131038 A1 * | 7/2004 | Kim et al. ..................... | 370/342 |
| 2005/0286663 A1 * | 12/2005 | Poon ............................. | 375/347 |
| 2006/0092054 A1 | 5/2006 | Li et al. | |
| 2006/0155533 A1 | 7/2006 | Lin et al. | |
| 2006/0279460 A1 * | 12/2006 | Yun et al. ...................... | 342/377 |
| 2008/0108310 A1 * | 5/2008 | Tong et al. ....................... | 455/69 |
| 2010/0067594 A1 * | 3/2010 | Lin et al. ...................... | 375/260 |

OTHER PUBLICATIONS

Roth et al."Frame for enabling closed-loop MIMO for OFDMA";Jan. 25, 2005;IEEE 802.16 broadvand wireless access working group,IEEEC80.16e-04/552r5.*

Love et al., "Grassmannian Beamforming for Multiple-Input Multiple-Output Wireless Systems", IEEE Transactions on Information Theory, vol. 49, No. 10, Oct. 2003, pp. 2735-2747.

Hochwald et al., "Systematic Design of Unitary Space-Time Constellations", IEEE Transactions on Information Theory, vol. 46, No. 6, Sep. 2000, pp. 1962-1973.

Broadband Wireless Access Working Group, "Compact codebooks for transmit beamforming in closed-loop MIMO", IEEE 802.16-16e-05/50r6, Jan. 26, 2005.

* cited by examiner

*Primary Examiner* — Daniel Washburn
*Assistant Examiner* — Rahel Guarino
(74) *Attorney, Agent, or Firm* — Alston & Bird LLP (57) ABSTRACT

The invention is related to a data processing method comprising: selecting from at least one codebook a codebook and at least one weight in the codebook fulfilling a predetermined performance criterion, wherein one of the at least one codebook is of the form:

$$\begin{bmatrix} 1 & 0 & \sqrt{0.5} & \sqrt{0.5} & \sqrt{0.5} \\ 0 & 1 & \sqrt{0.5}\,e^{j0} & \sqrt{0.5}\,e^{j\frac{\pi}{3}} & \sqrt{0.5}\,e^{j\frac{2\pi}{3}} \end{bmatrix}$$

$$\begin{bmatrix} \sqrt{0.5} & \sqrt{0.5} & \sqrt{0.5} \\ \sqrt{0.5}\,e^{j\pi} & \sqrt{0.5}\,e^{j\frac{4\pi}{3}} & \sqrt{0.5}\,e^{j\frac{5\pi}{3}} \end{bmatrix};$$

and informing the selected at least one codebook and weight to a transmitter for being used in transmission.

30 Claims, 2 Drawing Sheets

DATA PROCESSING METHOD, DATA TRANSMISSION METHOD, DATA RECEPTION METHOD, APPARATUS, CODEBOOK, COMPUTER PROGRAM PRODUCT, COMPUTER PROGRAM DISTRIBUTION MEDIUM

FIELD

The invention relates to a data processing method, data transmission methods, a data reception method, apparatuses, a codebook, computer program products and computer program distribution media.

BACKGROUND

In wireless communication systems, multiple antennas can be used for improving link reliability and/or increasing transmission rate. Multiple antenna techniques can be categorized on the basis of the availability of channel state information at a transmitter in two groups: an open loop mode and a closed loop.

In case of a closed loop mode transmission, pre-coding can be used to improve performance of a multiple antenna system.

In practice, feedback bandwidth constraint, feedback delay and channel estimation errors may cause channel state information at a transmitter, which is based on feedback information, being imperfect. For such cases, a transmitter and a receiver may have a common pre-coding codebook, i.e. a finite collection of pre-coding vectors (codewords). The receiver typically decides which vector or vectors of the codebook are selected for use and feedbacks its index to a transmitter via a feedback channel. Another possibility is that the transmitter decides which vector or vectors of the codebook are selected for its data transmission and signals its index to a receiver in order to allow data detection at the receiver end.

Several prior art codebooks are presented. Some of them are shown in D. J. Love and R. W. Heath, "Grassmannian beamforming for multiple-input multiple-output wireless systems", IEEE Transactions on Information Theory, vol. 49, No. 10, pp. 2735-2747, October 2003; B. M. Hochwald, T. L. Marzetta, T. J. Richardson, W. Sweldens and R. Urbanke, "Systematic Design of Unitary Space-Time Constellations", IEEE Transactions on Information Theory, vol. 46, No. 6, pp. 1962-1973, September 2000 and Intel et al., "Compact Codebooks for Transmit Beamforming in Closed-Loop MIMO", IEEE C802.16e-05/050r6, which are taken herein as a reference.

However, a problem is that they usually do not provide good performance in different channel conditions, for example, some of them are good only in weakly correlated channels, whereas others are good only in strongly correlated channels.

BRIEF DESCRIPTION OF THE INVENTION

According to an aspect of the invention, there is provided a data processing method comprising: selecting from at least one codebook a codebook and at least one weight in the codebook fulfilling a predetermined performance criterion, wherein one of the at least one codebook is of the form:

$$\begin{bmatrix} 1 & 0 & \sqrt{0.5} & \sqrt{0.5} & \sqrt{0.5} & \sqrt{0.5} & \sqrt{0.5} & \sqrt{0.5} \\ 0 & 1 & \sqrt{0.5}\,e^{j0} & \sqrt{0.5}\,e^{j\frac{\pi}{3}} & \sqrt{0.5}\,e^{j\frac{2\pi}{3}} & \sqrt{0.5}\,e^{j\pi} & \sqrt{0.5}\,e^{j\frac{4\pi}{3}} & \sqrt{0.5}\,e^{j\frac{5\pi}{3}} \end{bmatrix};$$

and informing the selected at least one codebook and weight to a transmitter for being used in transmission.

According to another aspect of the invention, there is provided a data transmission method comprising: receiving information on at least one codebook and at least one weight in the codebook fulfilling a predetermined performance criterion, wherein one of the at least one codebook is of the form:

$$\begin{bmatrix} 1 & 0 & \sqrt{0.5} & \sqrt{0.5} & \sqrt{0.5} & \sqrt{0.5} & \sqrt{0.5} & \sqrt{0.5} \\ 0 & 1 & \sqrt{0.5}\,e^{j0} & \sqrt{0.5}\,e^{j\frac{\pi}{3}} & \sqrt{0.5}\,e^{j\frac{2\pi}{3}} & \sqrt{0.5}\,e^{j\pi} & \sqrt{0.5}\,e^{j\frac{4\pi}{3}} & \sqrt{0.5}\,e^{j\frac{5\pi}{3}} \end{bmatrix};$$

and applying the at least one weight in signal pre-coding for transmission or reception.

According to another aspect of the invention, there is provided a data transmission method comprising: selecting from at least one codebook a codebook and at least one weight in the codebook fulfilling a predetermined performance criterion, wherein one of the at least one codebook is of the form:

$$\begin{bmatrix} 1 & 0 & \sqrt{0.5} & \sqrt{0.5} & \sqrt{0.5} & \sqrt{0.5} & \sqrt{0.5} & \sqrt{0.5} \\ 0 & 1 & \sqrt{0.5}\,e^{j0} & \sqrt{0.5}\,e^{j\frac{\pi}{3}} & \sqrt{0.5}\,e^{j\frac{2\pi}{3}} & \sqrt{0.5}\,e^{j\pi} & \sqrt{0.5}\,e^{j\frac{4\pi}{3}} & \sqrt{0.5}\,e^{j\frac{5\pi}{3}} \end{bmatrix};$$

informing the selected at least one codebook and weight to a receiver for being used in reception; and applying the at least one weight in signal pre-coding for transmission.

According to another aspect of the invention, there is provided a data reception method comprising: receiving information on at least one codebook and at least one weight in the codebook used in signal pre-coding in transmission, wherein one of the at least one codebook is of the form:

$$\begin{bmatrix} 1 & 0 & \sqrt{0.5} & \sqrt{0.5} & \sqrt{0.5} & \sqrt{0.5} & \sqrt{0.5} & \sqrt{0.5} \\ 0 & 1 & \sqrt{0.5}\,e^{j0} & \sqrt{0.5}\,e^{j\frac{\pi}{3}} & \sqrt{0.5}\,e^{j\frac{2\pi}{3}} & \sqrt{0.5}\,e^{j\pi} & \sqrt{0.5}\,e^{j\frac{4\pi}{3}} & \sqrt{0.5}\,e^{j\frac{5\pi}{3}} \end{bmatrix};$$

and using for reception the at least one weight used in signal pre-coding in transmission.

According to another aspect of the invention, there is provided an apparatus configured to: select from at least one codebook a codebook and at least one weight in the codebook fulfilling a predetermined performance criterion, wherein one of the at least one codebook is of the form:

$$\begin{bmatrix} 1 & 0 & \sqrt{0.5} & \sqrt{0.5} & \sqrt{0.5} & \sqrt{0.5} & \sqrt{0.5} & \sqrt{0.5} \\ 0 & 1 & \sqrt{0.5}\,e^{j0} & \sqrt{0.5}\,e^{j\frac{\pi}{3}} & \sqrt{0.5}\,e^{j\frac{2\pi}{3}} & \sqrt{0.5}\,e^{j\pi} & \sqrt{0.5}\,e^{j\frac{4\pi}{3}} & \sqrt{0.5}\,e^{j\frac{5\pi}{3}} \end{bmatrix};$$

and inform the selected at least one codebook and weight to a transmitter for being used in transmission.

According to another aspect of the invention, there is provided an apparatus configured to: receive information on at least one codebook and at least one weight in the codebook used in signal pre-coding in transmission, wherein one of the at least one codebook is of the form:

$$\begin{bmatrix} 1 & 0 & \sqrt{0.5} & \sqrt{0.5} & \sqrt{0.5} & \sqrt{0.5} & \sqrt{0.5} & \sqrt{0.5} \\ 0 & 1 & \sqrt{0.5}\,e^{j0} & \sqrt{0.5}\,e^{j\frac{\pi}{3}} & \sqrt{0.5}\,e^{j\frac{2\pi}{3}} & \sqrt{0.5}\,e^{j\pi} & \sqrt{0.5}\,e^{j\frac{4\pi}{3}} & \sqrt{0.5}\,e^{j\frac{5\pi}{3}} \end{bmatrix};$$

and use for reception the at least one weight used in signal pre-coding in transmission.

According to another aspect of the invention, there is provided an apparatus configured to: receive information on at least one codebook and at least one weight in the codebook fulfilling a predetermined performance criterion, wherein one of the at least one codebook is of the form:

$$\begin{bmatrix} 1 & 0 & \sqrt{0.5} & \sqrt{0.5} & \sqrt{0.5} & \sqrt{0.5} & \sqrt{0.5} & \sqrt{0.5} \\ 0 & 1 & \sqrt{0.5}\,e^{j0} & \sqrt{0.5}\,e^{j\frac{\pi}{3}} & \sqrt{0.5}\,e^{j\frac{2\pi}{3}} & \sqrt{0.5}\,e^{j\pi} & \sqrt{0.5}\,e^{j\frac{4\pi}{3}} & \sqrt{0.5}\,e^{j\frac{5\pi}{3}} \end{bmatrix};$$

and apply the at least one weight in signal pre-coding for transmission.

According to another aspect of the invention, there is provided an apparatus configured to: select from at least one codebook a codebook and at least one weight in the codebook fulfilling a predetermined performance criterion, wherein one of the at least one codebook is of the form:

$$\begin{bmatrix} 1 & 0 & \sqrt{0.5} & \sqrt{0.5} & \sqrt{0.5} & \sqrt{0.5} & \sqrt{0.5} & \sqrt{0.5} \\ 0 & 1 & \sqrt{0.5}\,e^{j0} & \sqrt{0.5}\,e^{j\frac{\pi}{3}} & \sqrt{0.5}\,e^{j\frac{2\pi}{3}} & \sqrt{0.5}\,e^{j\pi} & \sqrt{0.5}\,e^{j\frac{4\pi}{3}} & \sqrt{0.5}\,e^{j\frac{5\pi}{3}} \end{bmatrix};$$

inform the selected at least one codebook and weight to a receiver for being used in reception; and apply the at least one weight in signal pre-coding for transmission.

According to another aspect of the invention, there is provided an apparatus comprising: means for selecting from at least one codebook a codebook and at least one weight in the codebook fulfilling a predetermined performance criterion, wherein one of the at least one codebook is of the form:

$$\begin{bmatrix} 1 & 0 & \sqrt{0.5} & \sqrt{0.5} & \sqrt{0.5} & \sqrt{0.5} & \sqrt{0.5} & \sqrt{0.5} \\ 0 & 1 & \sqrt{0.5}\,e^{j0} & \sqrt{0.5}\,e^{j\frac{\pi}{3}} & \sqrt{0.5}\,e^{j\frac{2\pi}{3}} & \sqrt{0.5}\,e^{j\pi} & \sqrt{0.5}\,e^{j\frac{4\pi}{3}} & \sqrt{0.5}\,e^{j\frac{5\pi}{3}} \end{bmatrix};$$

and means for informing the selected at least one codebook and weight to a transmitter for being used in transmission.

According to another aspect of the invention, there is provided an apparatus comprising: means for receiving information on at least one codebook and at least one weight in the codebook used in signal pre-coding in transmission, wherein one of the at least one codebook is of the form:

$$\begin{bmatrix} 1 & 0 & \sqrt{0.5} & \sqrt{0.5} & \sqrt{0.5} & \sqrt{0.5} & \sqrt{0.5} & \sqrt{0.5} \\ 0 & 1 & \sqrt{0.5}\,e^{j0} & \sqrt{0.5}\,e^{j\frac{\pi}{3}} & \sqrt{0.5}\,e^{j\frac{2\pi}{3}} & \sqrt{0.5}\,e^{j\pi} & \sqrt{0.5}\,e^{j\frac{4\pi}{3}} & \sqrt{0.5}\,e^{j\frac{5\pi}{3}} \end{bmatrix};$$

and means for using for reception the at least one weight used in signal pre-coding in transmission.

According to another aspect of the invention, there is provided an apparatus comprising: means for receiving information on at least one codebook and at least one weight in the codebook fulfilling a predetermined performance criterion, wherein one of the at least one codebook is of the form:

$$\begin{bmatrix} 1 & 0 & \sqrt{0.5} & \sqrt{0.5} & \sqrt{0.5} & \sqrt{0.5} & \sqrt{0.5} & \sqrt{0.5} \\ 0 & 1 & \sqrt{0.5}\,e^{j0} & \sqrt{0.5}\,e^{j\frac{\pi}{3}} & \sqrt{0.5}\,e^{j\frac{2\pi}{3}} & \sqrt{0.5}\,e^{j\pi} & \sqrt{0.5}\,e^{j\frac{4\pi}{3}} & \sqrt{0.5}\,e^{j\frac{5\pi}{3}} \end{bmatrix};$$

and means for applying the at least one weight in signal pre-coding for transmission.

According to another aspect of the invention, there is provided an apparatus comprising: means for selecting from at least one codebook a codebook and at least one weight in the codebook fulfilling a predetermined performance criterion, wherein one of the at least one codebook is of the form:

$$\begin{bmatrix} 1 & 0 & \sqrt{0.5} & \sqrt{0.5} & \sqrt{0.5} & \sqrt{0.5} & \sqrt{0.5} & \sqrt{0.5} \\ 0 & 1 & \sqrt{0.5}\,e^{j0} & \sqrt{0.5}\,e^{j\frac{\pi}{3}} & \sqrt{0.5}\,e^{j\frac{2\pi}{3}} & \sqrt{0.5}\,e^{j\pi} & \sqrt{0.5}\,e^{j\frac{4\pi}{3}} & \sqrt{0.5}\,e^{j\frac{5\pi}{3}} \end{bmatrix};$$

means for informing the selected at least one codebook and weight to a receiver for being used in reception; and means for applying the at least one weight in signal pre-coding for transmission.

According to another aspect of the invention, there is provided a codebook, the codebook being:

$$\begin{bmatrix} 1 & 0 & \sqrt{0.5} & \sqrt{0.5} & \sqrt{0.5} & \sqrt{0.5} & \sqrt{0.5} & \sqrt{0.5} \\ 0 & 1 & \sqrt{0.5}\,e^{j0} & \sqrt{0.5}\,e^{j\frac{\pi}{3}} & \sqrt{0.5}\,e^{j\frac{2\pi}{3}} & \sqrt{0.5}\,e^{j\pi} & \sqrt{0.5}\,e^{j\frac{4\pi}{3}} & \sqrt{0.5}\,e^{j\frac{5\pi}{3}} \end{bmatrix}.$$

According to another aspect of the invention, there is provided a computer program product encoding a computer program of instructions for executing a computer process for data processing, the process comprising: selecting from at least one codebook a codebook and at least one weight in the codebook fulfilling a predetermined performance criterion, wherein one of the at least one codebook is of the form:

$$\begin{bmatrix} 1 & 0 & \sqrt{0.5} & \sqrt{0.5} & \sqrt{0.5} & \sqrt{0.5} & \sqrt{0.5} & \sqrt{0.5} \\ 0 & 1 & \sqrt{0.5}\,e^{j0} & \sqrt{0.5}\,e^{j\frac{\pi}{3}} & \sqrt{0.5}\,e^{j\frac{2\pi}{3}} & \sqrt{0.5}\,e^{j\pi} & \sqrt{0.5}\,e^{j\frac{4\pi}{3}} & \sqrt{0.5}\,e^{j\frac{5\pi}{3}} \end{bmatrix}.$$

According to another aspect of the invention, there is provided a computer program distribution medium readable by a computer and encoding a computer program of instructions for executing a computer process for data processing, the process comprising: selecting from at least one codebook a codebook and at least one weight in the codebook fulfilling a predetermined performance criterion, wherein one of the at least one codebook is of the form:

$$\begin{bmatrix} 1 & 0 & \sqrt{0.5} & \sqrt{0.5} & \sqrt{0.5} & \sqrt{0.5} & \sqrt{0.5} & \sqrt{0.5} \\ 0 & 1 & \sqrt{0.5}\,e^{j0} & \sqrt{0.5}\,e^{j\frac{\pi}{3}} & \sqrt{0.5}\,e^{j\frac{2\pi}{3}} & \sqrt{0.5}\,e^{j\pi} & \sqrt{0.5}\,e^{j\frac{4\pi}{3}} & \sqrt{0.5}\,e^{j\frac{5\pi}{3}} \end{bmatrix}.$$

According to another aspect of the invention, there is provided a computer program product encoding a computer program of instructions for executing a computer process for data transmission, the process comprising: searching for at least one weight for signal pre-coding for transmission from a codebook, wherein the codebook is of the form:

$$\begin{bmatrix} 1 & 0 & \sqrt{0.5} & \sqrt{0.5} & \sqrt{0.5} & \sqrt{0.5} & \sqrt{0.5} & \sqrt{0.5} \\ 0 & 1 & \sqrt{0.5}\,e^{j0} & \sqrt{0.5}\,e^{j\frac{\pi}{3}} & \sqrt{0.5}\,e^{j\frac{2\pi}{3}} & \sqrt{0.5}\,e^{j\pi} & \sqrt{0.5}\,e^{j\frac{4\pi}{3}} & \sqrt{0.5}\,e^{j\frac{5\pi}{3}} \end{bmatrix};$$

and carrying out signal pre-coding for transmission.

According to another aspect of the invention, there is provided a computer program distribution medium readable by a computer and encoding a computer program of instructions for executing a computer process for data transmission, the process comprising: searching for at least one weight for signal pre-coding for transmission from a codebook, wherein the codebook is of the form:

$$\begin{bmatrix} 1 & 0 & \sqrt{0.5} & \sqrt{0.5} & \sqrt{0.5} & \sqrt{0.5} & \sqrt{0.5} & \sqrt{0.5} \\ 0 & 1 & \sqrt{0.5}\,e^{j0} & \sqrt{0.5}\,e^{j\frac{\pi}{3}} & \sqrt{0.5}\,e^{j\frac{2\pi}{3}} & \sqrt{0.5}\,e^{j\pi} & \sqrt{0.5}\,e^{j\frac{4\pi}{3}} & \sqrt{0.5}\,e^{j\frac{5\pi}{3}} \end{bmatrix};$$

and carrying out signal pre-coding for transmission.

According to another aspect of the invention, there is provided a computer program product encoding a computer program of instructions for executing a computer process for data processing, the process comprising: receiving information on at least one codebook and at least one weight in the codebook used in signal pre-coding in transmission, wherein one of the at least one codebook is of the form:

$$\begin{bmatrix} 1 & 0 & \sqrt{0.5} & \sqrt{0.5} & \sqrt{0.5} & \sqrt{0.5} & \sqrt{0.5} & \sqrt{0.5} \\ 0 & 1 & \sqrt{0.5}\,e^{j0} & \sqrt{0.5}\,e^{j\frac{\pi}{3}} & \sqrt{0.5}\,e^{j\frac{2\pi}{3}} & \sqrt{0.5}\,e^{j\pi} & \sqrt{0.5}\,e^{j\frac{4\pi}{3}} & \sqrt{0.5}\,e^{j\frac{5\pi}{3}} \end{bmatrix};$$

and using for reception the at least one weight used in signal pre-coding in transmission.

According to another aspect of the invention, there is provided a computer program distribution medium readable by a computer and encoding a computer program of instructions for executing a computer process for data transmission, the process comprising: receiving information on at least one codebook and at least one weight in the codebook used in signal pre-coding in transmission, wherein one of the at least one codebook is of the form:

$$\begin{bmatrix} 1 & 0 & \sqrt{0.5} & \sqrt{0.5} & \sqrt{0.5} & \sqrt{0.5} & \sqrt{0.5} & \sqrt{0.5} \\ 0 & 1 & \sqrt{0.5}\,e^{j0} & \sqrt{0.5}\,e^{j\frac{\pi}{3}} & \sqrt{0.5}\,e^{j\frac{2\pi}{3}} & \sqrt{0.5}\,e^{j\pi} & \sqrt{0.5}\,e^{j\frac{4\pi}{3}} & \sqrt{0.5}\,e^{j\frac{5\pi}{3}} \end{bmatrix};$$

and using for reception the at least one weight used in signal pre-coding in transmission.

The invention provides several advantages.

An embodiment of the invention provides a codebook providing better performance compared to prior art code books especially in changing channel conditions.

LIST OF DRAWINGS

In the following, the invention will be described in greater detail with reference to the embodiments and the accompanying drawings, in which.

DESCRIPTION OF EMBODIMENTS

Figure 1:
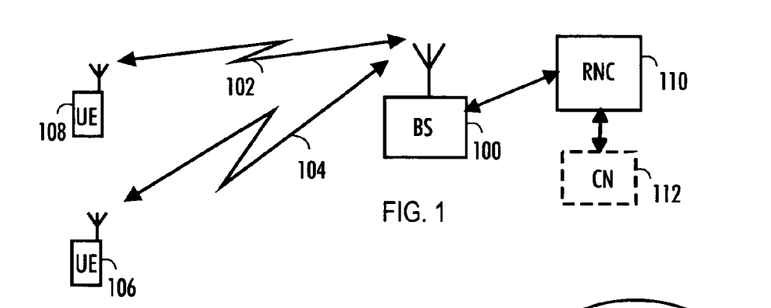
FIG. 1 shows an example of a communication system.

With reference to FIG. 1, we examine an example of a communications system to which embodiments of the invention can be applied. One example of such a communications system is a Universal Mobile Telecommunications System (UMTS) radio access network (UTRAN). It is a radio access network which includes wideband code division multiple access (WCDMA) technology and can also offer real-time circuit and packet switched services. The embodiments are not, however, restricted to the systems given as examples but a person skilled in the art may apply the solution to other communications systems provided with the necessary properties. The communications system may for instance be a multiple-input-multiple-output (MIMO) system.

FIG. 1 is a simplified illustration of a data transmission system (a communications system) to which embodiments according to the invention are applicable. This is a part of a cellular radio system which comprises a base station (or node B) 100, which has bi-directional radio links 102 and 104 to user devices 106 and 108. The user devices may be fixed, vehicle-mounted or portable. The user devices are provided with antenna units which may include a plurality of antennas. The base station includes transceivers, for instance. From the transceivers of the base station, a connection is provided to an antenna unit that establishes bi-directional radio links to the user devices. The antenna unit may include a plurality of antennas. The base station is further connected to a controller 110, a radio network controller (RNC), which transmits the connections of the devices to other parts of the network. The radio network controller controls in a centralized manner several base stations connected thereto. The radio network controller is further connected to a core network 112 (CN). Depending on the system, the counterpart on the CN side can be a mobile services switching centre (MSC), a media gateway (MGW) or a serving GPRS (general packet radio service) support node (SGSN), etc.

It should be noticed that in future radio networks, the functionality of an RNC may be distributed among (possibly a subset of) base stations.

The communications system is also able to communicate with other networks, such as a public switched telephone network or the Internet.

Precoding or beamforming are typically used for improving performance of multiple antenna systems. Precoding is usually used in transmitters to compensate for distortion introduced by channel response and/or noise whitening filters used in receivers.

For precoding, channel state information (CSI) is usually furnished to a transmitter by using a feedback signal from a receiver in a frequency division duplex (FDD) mode or in time division duplex (TDD) mode by using the reciprocity principle. Alternatively, in FDD mode, the receiver may decide on antenna weighting, and feedback this information via a feedback channel.

Beamforming is a signal processing technique used with arrays of transmitters or receivers that controls a radiation pattern by creating beams and nulls in selected areas. Beamforming may also be thought of as spatial filtering.

A transmitter and a receiver may have a common precoding codebook, i.e. a finite collection of pre-coding vectors (codewords). The receiver typically decides which vector or vectors of the codebook are selected for use and feedbacks its index to a transmitter via a feedback channel. After receiving the codeword index, the transmitter uses corresponding precoding vector or vectors for data transmission. Another possibility is that the transmitter selects the precoding weights based on the available channel state information (CSI) and signals the selected and applied precoding weight to the receiver. The selection of precoding weights from a codebook itself typically follows selected criteria, for instance maximizing post-processing signal-to-interference/noise ratio (SINR) or maximizing the received total signal power.

In the following, as an example, a single stream precoding is described. A multiple-input-single-output (MISO) system with 2 transmission antennas and 1 reception antenna over a flat fading Rayleigh channel is assumed. The signal model is given by:

$$y=hws+z, \quad (1)$$

wherein y denotes a received signal, h denotes a channel matrix of form $[h_1 \; h_2]$, wherein two elements denote channel coefficients from transmission antenna 1 and transmission antenna 2 to a reception antenna, w denotes a precoding weight for the two transmission antennas and is form $$\begin{bmatrix} w_1 \\ w_2 \end{bmatrix}$$

which is normalized to obtain $\|w\|^2=1$, $w_1$ denotes the complex weighting factor for transmission antenna 1, $w_2$ denotes the complex weighting factor for transmission antenna 2, s denotes a transmitted data symbol, and z denotes noise at a receiver.

Typically, both transmitter and a receiver maintain a common codebook comprising $L=2^m$ precoding vectors $\Omega=\{w_1, \ldots, w_L\}$, wherein L denotes the number of precoding vectors inside the codebook—or codebook size, m denotes the number of feedback bits $\Omega$ denotes a precoding codebook consisting of L precoding vectors, $w_1$ denotes a first precoding vector of the codebook $\Omega$, and $w_L$ denotes the L-th precoding vector of the codebook $\Omega$.

Let us now, as an example, maximize the total received signal power as a selection criterion for precoding vector $w_i$ from codebook $\Omega$ by:

$$\max_i \{\|h \cdot w_i\|^2\} \quad (2)$$

wherein $i \in \{1 \ldots L\}$ or $w_i \in \Omega=\{w_1, \ldots w_L\}$, respectively, h denotes a channel matrix of form $[h_1 \; h_2]$, wherein two elements denote channel coefficients from transmission antenna 1 and transmission antenna 2 to a reception antenna, $w_i$ denotes a precoding weight for the two transmission antennas and is of form $$\begin{bmatrix} w_1 \\ w_2 \end{bmatrix},$$

and $\| \; \|$ denotes a norm.

A receiver typically feedbacks m bits which denotes an index of a best weight i via a feedback channel. A transmitter performs precoding based on the index i. Alternatively, the transmitter might select the weight and signals the m bits to the receiver. Index information is used for minimizing information conveyed via a radio channel. Naturally, also a codebook or weights can be conveyed, but it usually is a waste of resources.

Several prior art codebooks exist. However, a problem is that they usually do not provide good performance in different channel conditions, for example, some of them are good in weakly correlated channels, whereas others are good in strongly correlated channels.

The 3-bit codebook used in an embodiment of the invention written in a matrix form:

$$\begin{bmatrix} 1 & 0 & \sqrt{0.5} & \sqrt{0.5} & \sqrt{0.5} & \sqrt{0.5} & \sqrt{0.5} & \sqrt{0.5} \\ 0 & 1 & \sqrt{0.5}\,e^{j0} & \sqrt{0.5}\,e^{j\frac{\pi}{3}} & \sqrt{0.5}\,e^{j\frac{2\pi}{3}} & \sqrt{0.5}\,e^{j\pi} & \sqrt{0.5}\,e^{j\frac{4\pi}{3}} & \sqrt{0.5}\,e^{j\frac{5\pi}{3}} \end{bmatrix};$$

is proposed for 2 transmission antennas.

In the codebook given in a matrix form above, each column contains a possible precoding weight for a single stream. In case of multi-stream transmission, one precoding weight represented by one vector in the codebook matrix above is used for precoding one transmission stream.

In case of linear precoding, the relation between amplitude and phase of transmit antennas defines how a channel will be spatially excited.

Beamforming with transmission weight $w_i$ and $A \cdot e^{j\phi} \cdot w_i$, wherein $w_i$ is the i-th precoding vector of the codebook;

A is a real valued multiplicative amplitude factor; and $\phi$ is a phase factor, results in the same transmission beam. The absolute phase of the transmission weights affected by the phase factor $\phi$, does only effect the phase of the received signal. The absolute amplitude influenced by A directly defines the received signal strength and can be understood as a part of transmission power control. As a consequence, the codebook presented above normalizes each of the preceding vectors to have power one: $\|w_i\|^2=1 \; \forall \; i \in [1, \ldots, L]$ and the phase reference is set to the first transmission antenna, meaning that the weighting factor for antenna 1 of the i-th preceding vector $w_{1,i}$ is real valued (phase$\{w_{1,i}\}=0 \; \forall \; i \in [1, \ldots, L]$).

The codebook combines amplitude adaptation via basic transmission antenna selection with a 6-state phase adaptation. On one hand, amplitude adaptation is important especially for uncorrelated or weakly correlated channels. On the other hand, phase adaptation is especially useful in improving the performance of precoding in strongly correlated channels. The codebook includes two antenna selection weights ($w_1$, $w_2$) and six equal power weights having different transmission phases ($w_3, \ldots, w_8$), For the six equal power weights, the difference in the transmission phases is given in multiples of $\pi/3$:

$$\frac{w_{2,i}}{w_{1,i}} = \exp(j \cdot [(i-3) \cdot \pi/3 + \varphi]), \quad i \in [3, \ldots, 8], \quad (3)$$

wherein $w_{1,i}$ denotes the complex weighting factor for TX antenna 1 of the i-th weight vector, $w_{2,i}$ denotes the complex weighting factor for TX antenna 2 of the i-th weight vector, and $\varphi$ denotes a phase reference.

The performance of the presented codebook is independent of the choice of the phase reference $\varphi$. The important property is only, that the phase differences between the phase adaptation vectors $w_3, \ldots, w_8$ are defined by multiples of $\pi/3$.

The codebook also includes 4 orthogonal weight pairs ($\{w_1, w_2\}$, $\{w_3, w_6\}$, $\{w_4, w_7\}$ and $\{w_5, w_8\}$), which are particularly useful when performing multiple stream precoding or multi-user preceding. In the case of multiple stream preceding transmission or precoded multiple input-multiple output (MIMO) information, a beam weight for a first stream can be selected from the codebook according to a certain selection criteria (e.g. to maximize a post-processing signal-to-noise-ratio); a receiver typically conveys the index of the weight. For a second transmission stream, a weight which is orthogonal to the first weight is selected. In the case of multi-stream transmission or multi-user transmission, an orthogonal weight pair can also be selected based on a selection criterion considering both streams (e.g. maximizing the sum throughput of both streams).

Hence, the codebook provides proper preceding weights for single stream transmission (including antenna selection), multi-stream transmission, such as vector modulation or Per-Antenna Rate Control (PARC) as well as multi-user/terminal transmission, such as Space Division Multiple Access (SDMA).

Figures 2, 4:
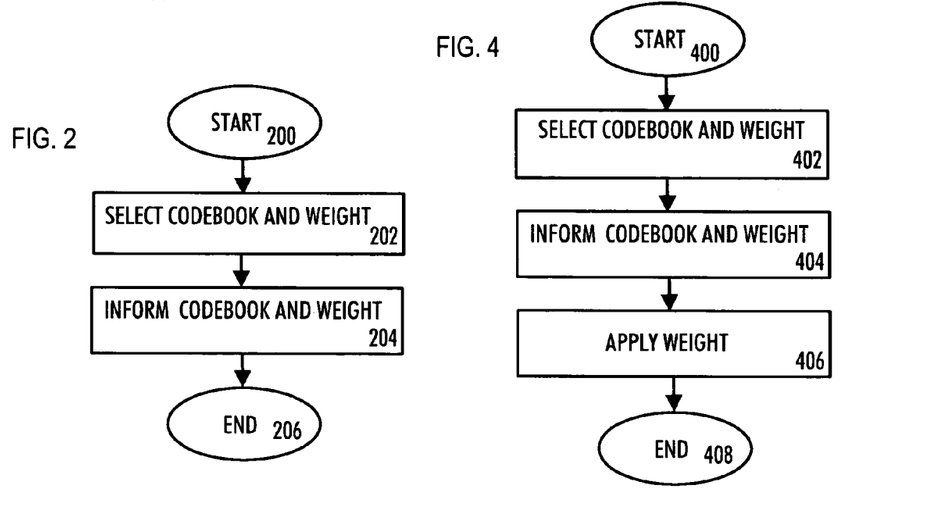
FIG. 2 is a flow-chart.
FIG. 4 is yet another flow-chart.

In an embodiment of a data processing method carried out in a receiver, at least one codebook and at least one weight in the codebook fulfilling a predetermined performance criterion is selected. One of the codebooks is:

$$\begin{bmatrix} 1 & 0 & \sqrt{0.5} & \sqrt{0.5} & \sqrt{0.5} & \sqrt{0.5} & \sqrt{0.5} & \sqrt{0.5} \\ 0 & 1 & \sqrt{0.5}\,e^{j0} & \sqrt{0.5}\,e^{j\frac{\pi}{3}} & \sqrt{0.5}\,e^{j\frac{2\pi}{3}} & \sqrt{0.5}\,e^{j\pi} & \sqrt{0.5}\,e^{j\frac{4\pi}{3}} & \sqrt{0.5}\,e^{j\frac{5\pi}{3}} \end{bmatrix}$$

(block 202 in FIG. 2). Naturally, if only one codebook is provided in a receiver and/or a transmitter, namely the codebook depicted above, no actual codebook selection is needed.

The performance criterion may be set in a system specification or it can be defined by a user terminal, for example.

There are several options to be used as a criterion: maximizing post-processing signal-to-interference/noise ratio (SINR) or maximizing the received total signal power, etc. The used criterion may also vary cast to case. Naturally, combinations of several criteria are also possible.

In block 204, the selected at least one codebook and weight are informed to a transmitter for being used in transmission. Naturally, if only one codebook is provided in a receiver and/or in a transmitter, namely the codebook depicted above, no codebook information may be conveyed to a transmitter. In that case, only information to be conveyed may be weight information, for instance indexes pointing to selected weights.

The embodiment begins in block 200 and ends in block 206. The embodiment is also repeatable.

Figure 3:
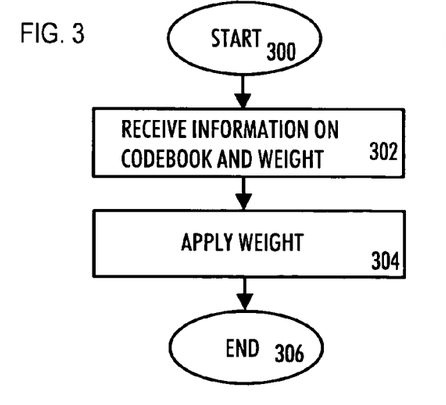
FIG. 3 is another flow-chart.

In an embodiment of a data transmission method carried out in a transmitter, information on at least one codebook and at least one weight in the codebook fulfilling a predetermined performance criterion is received. One of the codebooks is:

$$\begin{bmatrix} 1 & 0 & \sqrt{0.5} & \sqrt{0.5} & \sqrt{0.5} & \sqrt{0.5} & \sqrt{0.5} & \sqrt{0.5} \\ 0 & 1 & \sqrt{0.5}\,e^{j0} & \sqrt{0.5}\,e^{j\frac{\pi}{3}} & \sqrt{0.5}\,e^{j\frac{2\pi}{3}} & \sqrt{0.5}\,e^{j\pi} & \sqrt{0.5}\,e^{j\frac{4\pi}{3}} & \sqrt{0.5}\,e^{j\frac{5\pi}{3}} \end{bmatrix}$$

(block 302 In FIG. 3). The performance criterion may be set in a system specification or it can be defined by a user terminal, for example.

There are several options to be used as a performance criterion: maximizing post-processing signal-to-interference/noise ratio (SINR) or maximizing the received total signal power, etc. The used criterion may also vary case to case. Naturally, combinations of several criteria are also possible.

Naturally, if only one codebook is provided in a receiver and/or in a transmitter, namely the codebook depicted above, no codebook information is required in a transmitter. In that case, information to be received may only be weight information, for instance indexes pointing to selected weights.

In block 304, the at least one codebook is applied in signal pre-coding for transmission. Applying includes searching for the weights based on the index. Pre-coding may also be thought to be antenna beam weighting or signal stream weighting, as it is also called.

The embodiment begins in block 300 and ends in block 306. The embodiment is repeatable.

In another embodiment of a data transmission method carried out in a transmitter, the transmitter itself decides on its precoding weights since it has channel state information available (e.g. in frequency division duplex (FDD) systems through feedback and time division duplex (TDD) systems from the received signals).

In block 402 (FIG. 4), a codebook from at least one codebook and at least one weight in the codebook fulfilling a predetermined performance criterion are selected, wherein one of the at least one codebook is of the form:

$$\begin{bmatrix} 1 & 0 & \sqrt{0.5} & \sqrt{0.5} & \sqrt{0.5} & \sqrt{0.5} & \sqrt{0.5} & \sqrt{0.5} \\ 0 & 1 & \sqrt{0.5}\,e^{j0} & \sqrt{0.5}\,e^{j\frac{\pi}{3}} & \sqrt{0.5}\,e^{j\frac{2\pi}{3}} & \sqrt{0.5}\,e^{j\pi} & \sqrt{0.5}\,e^{j\frac{4\pi}{3}} & \sqrt{0.5}\,e^{j\frac{5\pi}{3}} \end{bmatrix}.$$

Naturally, if only one codebook is provided in a transmitter, namely the codebook depicted above, no actual codebook selection is needed.

The performance criterion may be set in a system specification or it can be defined by a user terminal, for example.

There are several options to be used as a performance criterion: maximizing post-processing signal-to-interference/noise ratio (SINR) or maximizing the received total signal power, etc. The used criterion may also vary case to case. Naturally, combinations of several criteria are also possible.

In block 404, the selected at least one codebook and weight are informed to a receiver for being used in reception, typically in data detection. Naturally, if only one codebook is provided in a receiver and in a transmitter, namely the codebook depicted above, no codebook information may be conveyed to a receiver. In that case, only information to be conveyed may be weight information, for instance indexes pointing to selected weights.

In block 406, the at least one weight is applied in signal pre-coding for transmission. Pre-coding may also be called antenna beam weighting or signal stream weighting.

Figure 6:
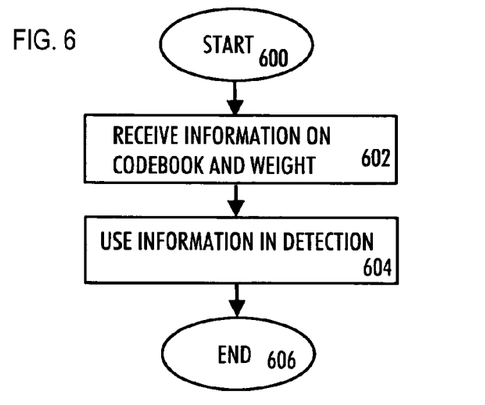
FIG. 6 is yet another flow-chart.

The embodiment begins in block 400 and ends in block 408. The embodiment is repeatable In an embodiment of a data reception method in a communication system (in block 602), a receiver receives information on at least one codebook and at least one weight in the codebook used in signal pre-coding in transmission, wherein one of the at least one codebook is of the form:

$$\begin{bmatrix} 1 & 0 & \sqrt{0.5} & \sqrt{0.5} & \sqrt{0.5} & \sqrt{0.5} & \sqrt{0.5} & \sqrt{0.5} \\ 0 & 1 & \sqrt{0.5}\,e^{j0} & \sqrt{0.5}\,e^{j\frac{\pi}{3}} & \sqrt{0.5}\,e^{j\frac{2\pi}{3}} & \sqrt{0.5}\,e^{j\pi} & \sqrt{0.5}\,e^{j\frac{4\pi}{3}} & \sqrt{0.5}\,e^{j\frac{5\pi}{3}} \end{bmatrix}.$$

Naturally, if only one codebook is provided, namely the codebook depicted above, no codebook information is required. In that case, information to be received may only be weight information, for instance indexes pointing to selected weights.

In block 604, the at least one weight used in signal pre-coding in transmission is used for reception, typically in data detection.

The embodiment begins in block 600 and ends in block 606. The embodiment is repeatable.

It should be noticed that other options for using weights than only a single weight for a single stream exist. In case of e.g. an orthogonal frequency division multiplexing (OFDM) or orthogonal frequency division multiple access (OFDMA) systems (link WiMax or 3.9G/3GPP LTE), there is a possibility to use for different subcarriers different transmission weights. If different weights for different subcarries are used, a weight may be selected as a function of frequency w(f), the index of a weight may be reported/feedbacked as a function of frequency i(f) and the weight may be applied in transmission and/or reception as a function of frequency. The selection of a codebook and weights/weight index in block 202 (the selection is carried out at a receiver) or in block 402 (the selection is carried out at the transmitter) may be implemented by using a computer program. Moreover, searching for weights may be implemented by a computer program. Also antenna weighting or signal pre-coding for transmission in the transmitter may be implemented by a computer program. Another option for implementation is ASIC (Application Specific Integrated Circuit) components. A hybrid of these different implementations is also feasible.

In a receiver, selection of a codebook may be implemented by using a computer program. In s transmitter, searching for weights may be implemented by a computer program. Also signal pre-coding for transmission may be implemented by a computer program. Another option is ASIC (Application Specific Integrated Circuit) components. A hybrid of these different implementations is also feasible.

The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, computer readable printed matter, and a computer readable compressed software package.

Figure 5:
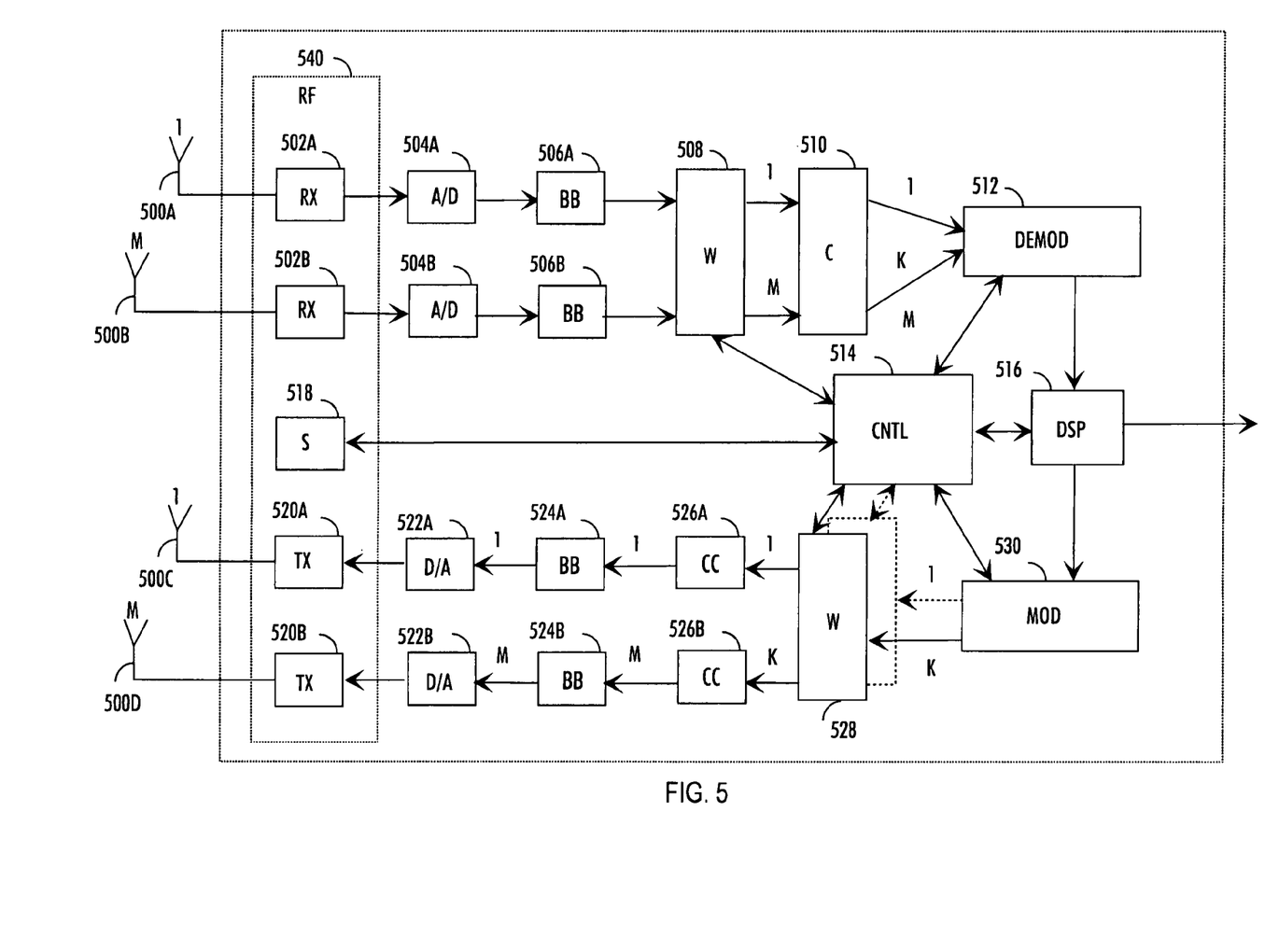
FIG. 5 illustrates an example of a transceiver.

FIG. 5 illustrates a simplified example of a transceiver including a receiver and a transmitter. It is obvious for a person skilled in the art that a receiver and/or a transmitter may have a different structure from what is depicted in FIG. 5 and the receiver and the transmitter may be placed in separate devices or modules partly or as a whole.

Both a receive part and a transmitter part include multiple antennas 500A, 500B for a receiver and 500C, 500D for a transmitter. The same antenna elements may also be used both for transmission and reception. The transceiver also provides beamforming means.

The antenna elements are arranged, for instance, linearly or planarly. In the linear case, the elements can be arranged so as to form a ULA (Uniform Linear Array), where the elements are in a straight line at equal distances. In the planar case, a CA (Circular Array), for example, can be formed, where the elements are on the same plane forming a circle circumference in the horizontal direction. In this case a certain sector of the circle is covered, e.g. 120 degrees or even the full circle, i.e. 360 degrees. In principle, the above mentioned uniplanar antenna structures can also be implemented as two- or even three-dimensional structures. A two-dimensional structure is achieved, for example, by placing ULA structures next to one another, the elements thus forming a matrix. The antenna elements of the antenna array may also comprise several antenna units. For instance, in case of a matrix-form antenna, the antenna element may refer to a matrix column of the matrix-form antenna.

A receiver front-ends 502A, 502B comprise filters which prevent frequencies outside the desired frequency bands. Then the signal is converted into an intermediate frequency or directly into a baseband frequency, in which form the signal is sampled and quantized in an analog/digital converter 504A, 504B. After the A/D conversion the signal is supplied to a base band processing blocks 506A, 506B, where dispreading, inverse fast Fourier transform (IFFT), etc. may be carried out, The signals received from multiple antennas are multiplied by an elementary unit of the antenna element in weighting means 508. After this, the signals can be combined in combining means 510. In case of a multi-stream/MIMO capable receiver, the blocks 508 and 510 might generate from the M antenna specific signals by weighting and combining K stream-specific signals processed further. In case of a single antenna receiver (M=K=1), the weighting means and combining means will be not be present in the receiver.

A demodulator 512 extracts the carrier wave effect from a received signal. A DSP block 516 performs digital signal processing, such as decoding and coding. The DSP block 516 can also determine weigh factors of antenna elements. A control unit 514 performs internal control functions by controlling different units.

Embodiments of the invention or part of them related to a receiver, such as selecting from at least one codebook a codebook and at least one weight in the codebook fulfilling a predetermined performance criterion, may be carried out by the control unit 514. Information transmission may be carried out by the transmitter part of the transceiver.

In the transmission, a modulator 530 modulates digital signals to a radio-frequency carrier wave. In weighting means 528, the signal is multiplied by elementary units corresponding to the antenna elements. This allows an antenna beam to be directed towards a complex vector formed by elementary units in digital phasing. Weighting is carried out individually for each of the K streams in case of multi-stream/MIMO transmission (depicted in the figure with another dotted-lined weighting block). The signals of different transmission streams are combined to a single signal per antenna in combining means 526A and 526B.

The signal to be transmitted is processed in baseband processing blocks 524A and 524B. In the baseband processing blocks 524A and 524B, the signal is e.g. spread by multiplying with a spreading code in case of a CDMA system or IFFT might be performed in case of orthogonal frequency division multiplexing (OFDM) or orthogonal frequency division multiple access (OFDMA), etc. Only one baseband block may also be provided.

The signal is converted from the digital form into the analog form by a digital/analog converter 522A, 522B. Each signal component is transmitted to a transmitter front end 520A, 520B corresponding to the antenna element in question. The transmitter front end comprises a filter for limiting the bandwidth. The transmitter also controls the output power of transmission.

A synthesizer 518 provides the necessary carrier-wave frequencies for the different units.

Embodiments of the invention or part of them related to a transmitter, such as selecting from at least one codebook a codebook and at least one weight in the codebook fulfilling a performance criterion and/or applying at least one weight in signal pre-coding for transmission per a transmission stream, may be carried out by the control means (unit) 514 and by the weighting means 528. Receiving information on at least one codebook and at least one weight in the codebook fulfilling a predetermined performance criterion may be carried out by the receiver part of the transceiver. It should be noted that typically a receiver in one end of a radio channel selects from at least one codebook a codebook and at least one weight in the codebook, and informs the selected at least one codebook and weight to a transmitter for being used in transmission, while a transmitter in other end receives information on at least one codebook and at least one weight in the codebook and applies the at least one weight in weighting antenna signal pre-coding for transmission.

it is also possible that the transmitter in one end of a radio channel selects from at least one codebook a codebook and at least one weight in the codebook, informs the selected at least one codebook and weight to a receiver for being used in reception and applies the at least one weight in signal pre-coding for transmission. The receiver in other end receives information on at least one codebook and at least one weight in the codebook and uses this information in reception of data transmitted by the transmitter.

Even though the invention has been described above with reference to an example according to the accompanying drawings, it is clear that the invention is not restricted thereto but it can be modified in several ways within the scope of the appended claims.

The invention claimed is:

1. A method comprising:
   selecting, by a receiver, from at least one codebook at least one precoding weight or vector, wherein the at least one codebook comprises antenna selection weights, equal power weights having different transmission phases and orthogonal beam weight pairs;
   and
   informing the selected at least one precoding weight or vector to a transmitter for being used in transmission.

2. The method of claim 1, wherein the at least one precoding weight or vector is a vector of form [w1, w2], wherein w1 denotes a complex weighting factor for a first transmission antenna and w2 denotes a complex weighting factor for a second transmission antenna.

3. The method of claim 1, wherein the at least one precoding weight or vector is a vector of form [w1, w2], wherein w1 denotes a complex weighting factor for a first transmission antenna and w2 denotes a complex weighting factor for a second transmission antenna, and wherein at least one of the complex weighting factors is real valued.

4. The method of claim 1, wherein the codebook comprises the following weights:

$$\begin{bmatrix} 1 & 0 & \sqrt{0.5} & \sqrt{0.5} & \sqrt{0.5} & \sqrt{0.5} & \sqrt{0.5} & \sqrt{0.5} \\ 0 & 1 & \sqrt{0.5}\,e^{j0} & \sqrt{0.5}\,e^{j\frac{\pi}{3}} & \sqrt{0.5}\,e^{j\frac{2\pi}{3}} & \sqrt{0.5}\,e^{j\pi} & \sqrt{0.5}\,e^{j\frac{4\pi}{3}} & \sqrt{0.5}\,e^{j\frac{5\pi}{3}} \end{bmatrix}.$$

5. A method comprising:
   receiving, by a transmitter, information on at least one precoding weight or vector in at least one codebook, wherein the at least one codebook comprises antenna selection weights, equal power weights having different transmission phases and orthogonal beam weight pairs;
   and applying the at least one precoding weight or vector in signal pre-coding for transmission.

6. The method of claim 5, wherein the at least one precoding weight or vector is a vector of form [w1, w2], wherein w1 denotes a complex weighting factor for a first transmission antenna and w2 denotes a complex weighting factor for a second transmission antenna.

7. The method of claim 5, wherein the at least one precoding weight or vector is a vector of form [w1, w2], wherein w1 denotes a complex weighting factor for a first transmission antenna and w2 denotes a complex weighting factor for a second transmission antenna, and wherein at least one of the complex weighting factors is real valued.

8. The method of claim 5, wherein the codebook comprises the following weights:

$$\begin{bmatrix} 1 & 0 & \sqrt{0.5} & \sqrt{0.5} & \sqrt{0.5} & \sqrt{0.5} & \sqrt{0.5} & \sqrt{0.5} \\ 0 & 1 & \sqrt{0.5}\,e^{j0} & \sqrt{0.5}\,e^{j\frac{\pi}{3}} & \sqrt{0.5}\,e^{j\frac{2\pi}{3}} & \sqrt{0.5}\,e^{j\pi} & \sqrt{0.5}\,e^{j\frac{4\pi}{3}} & \sqrt{0.5}\,e^{j\frac{5\pi}{3}} \end{bmatrix}.$$

9. An apparatus comprising
at least one processor, and
memory including computer program code, the memory and the computer program code configured to, with the at least one processor, cause the apparatus at least to:
select from at least one codebook at least one precoding weight or vector, wherein the at least one codebook comprises antenna selection weights, equal power weights having different transmission phases and orthogonal beam weight pairs;
and
inform the selected at least one precoding weight or vector to a transmitter for being used in transmission.

10. The apparatus of claim 9, wherein the apparatus comprises a receiver.

11. The apparatus of claim 9, wherein the at least one precoding weight or vector is a vector of form [w1, w2], wherein w1 denotes a complex weighting factor for a first transmission antenna and w2 denotes a complex weighting factor for a second transmission antenna.

12. The apparatus of claim 9, wherein the at least one precoding weight or vector is a vector of form [w1, w2], wherein w1 denotes a complex weighting factor for a first transmission antenna and w2 denotes a complex weighting factor for a second transmission antenna, and wherein at least one of the complex weighting factors is real valued.

13. The apparatus of claim 9, wherein the codebook comprises the following weights:

$$\begin{bmatrix} 1 & 0 & \sqrt{0.5} & \sqrt{0.5} & \sqrt{0.5} & \sqrt{0.5} & \sqrt{0.5} & \sqrt{0.5} \\ 0 & 1 & \sqrt{0.5}\,e^{j0} & \sqrt{0.5}\,e^{j\frac{\pi}{3}} & \sqrt{0.5}\,e^{j\frac{2\pi}{3}} & \sqrt{0.5}\,e^{j\pi} & \sqrt{0.5}\,e^{j\frac{4\pi}{3}} & \sqrt{0.5}\,e^{j\frac{5\pi}{3}} \end{bmatrix}.$$

14. An apparatus comprising
at least one processor, and
memory including computer program code, the memory and the computer program code configured to, with the at least one processor, cause the apparatus at least to:
receive information on at least one precoding weight or vector in at least one codebook, wherein the at least one codebook comprises antenna selection weights, equal power weights having different transmission phases and orthogonal beam weight pairs;
and
apply the at least one precoding weight or vector in signal pre-coding for transmission.

15. The apparatus of claim 14, wherein the apparatus comprises a transmitter.

16. The apparatus of claim 14, wherein the at least one precoding weight or vector is a vector of form [w1, w2], wherein w1 denotes a complex weighting factor for a first transmission antenna and w2 denotes a complex weighting factor for a second transmission antenna.

17. The apparatus of claim 14, wherein the at least one precoding weight or vector is a vector of form [w1, w2], wherein w1 denotes a complex weighting factor for a first transmission antenna and w2 denotes a complex weighting factor for a second transmission antenna, and wherein at least one of the complex weighting factors is real valued.

18. The apparatus of claim 14, wherein the codebook comprises the following weights:

$$\begin{bmatrix} 1 & 0 & \sqrt{0.5} & \sqrt{0.5} & \sqrt{0.5} & \sqrt{0.5} & \sqrt{0.5} & \sqrt{0.5} \\ 0 & 1 & \sqrt{0.5}\,e^{j0} & \sqrt{0.5}\,e^{j\frac{\pi}{3}} & \sqrt{0.5}\,e^{j\frac{2\pi}{3}} & \sqrt{0.5}\,e^{j\pi} & \sqrt{0.5}\,e^{j\frac{4\pi}{3}} & \sqrt{0.5}\,e^{j\frac{5\pi}{3}} \end{bmatrix}.$$

19. An apparatus comprising:
means for selecting by a receiver from at least one codebook at least one precoding weight or vector, wherein the at least one codebook comprises antenna selection weights, equal power weights having different transmission phases and orthogonal beam weight pairs;
and
means for informing the selected at least one precoding weight or vector to a transmitter for being used in transmission.

20. The apparatus of claim 19, wherein the apparatus comprises a receiver.

21. The apparatus of claim 19, wherein the codebook comprises the following weights:

$$\begin{bmatrix} 1 & 0 & \sqrt{0.5} & \sqrt{0.5} & \sqrt{0.5} & \sqrt{0.5} & \sqrt{0.5} & \sqrt{0.5} \\ 0 & 1 & \sqrt{0.5}\,e^{j0} & \sqrt{0.5}\,e^{j\frac{\pi}{3}} & \sqrt{0.5}\,e^{j\frac{2\pi}{3}} & \sqrt{0.5}\,e^{j\pi} & \sqrt{0.5}\,e^{j\frac{4\pi}{3}} & \sqrt{0.5}\,e^{j\frac{5\pi}{3}} \end{bmatrix}.$$

$$\begin{bmatrix} 1 & 0 & \sqrt{0.5} & \sqrt{0.5} & \sqrt{0.5} & \sqrt{0.5} & \sqrt{0.5} & \sqrt{0.5} \\ 0 & 1 & \sqrt{0.5}\,e^{j0} & \sqrt{0.5}\,e^{j\frac{\pi}{3}} & \sqrt{0.5}\,e^{j\frac{2\pi}{3}} & \sqrt{0.5}\,e^{j\pi} & \sqrt{0.5}\,e^{j\frac{4\pi}{3}} & \sqrt{0.5}\,e^{j\frac{5\pi}{3}} \end{bmatrix}.$$

22. An apparatus comprising:
means for receiving by a transmitter information on at least one precoding weight or vector in at least one codebook, wherein the at least one codebook comprises antenna selection weights, equal power weights having different transmission phases and orthogonal beam weight pairs; and
means for applying the at least one precoding weight or vector in signal pre-coding for transmission.

23. The apparatus of claim 22, wherein the apparatus comprises a transmitter.

24. The apparatus of claim 22, wherein the codebook comprises the following weights:

$$\begin{bmatrix} 1 & 0 & \sqrt{0.5} & \sqrt{0.5} & \sqrt{0.5} & \sqrt{0.5} & \sqrt{0.5} & \sqrt{0.5} \\ 0 & 1 & \sqrt{0.5}\,e^{j0} & \sqrt{0.5}\,e^{j\frac{\pi}{3}} & \sqrt{0.5}\,e^{j\frac{2\pi}{3}} & \sqrt{0.5}\,e^{j\pi} & \sqrt{0.5}\,e^{j\frac{4\pi}{3}} & \sqrt{0.5}\,e^{j\frac{5\pi}{3}} \end{bmatrix}.$$

25. A non-transitory computer program distribution medium readable by a computer and encoding a computer program of instructions for executing a computer process for data processing, the process comprising:
selecting, by a receiver, from at least one codebook at least one precoding weight or vector, wherein the at least one codebook comprises antenna selection weights, equal power weights having different transmission phases and orthogonal beam weight pairs; and
informing the selected at least one precoding weight or vector to a transmitter for being used in transmission.

26. The non-transitory computer program distribution medium of claim 25, the distribution medium including at least one of the following media: a computer readable medium, a program storage medium, a record medium, a computer readable memory, a computer readable software distribution package, and a computer readable compressed software package.

27. The non-transitory computer program distribution medium of claim 25, wherein the codebook comprises the following weights:

$$\begin{bmatrix} 1 & 0 & \sqrt{0.5} & \sqrt{0.5} & \sqrt{0.5} & \sqrt{0.5} & \sqrt{0.5} & \sqrt{0.5} \\ 0 & 1 & \sqrt{0.5}\,e^{j0} & \sqrt{0.5}\,e^{j\frac{\pi}{3}} & \sqrt{0.5}\,e^{j\frac{2\pi}{3}} & \sqrt{0.5}\,e^{j\pi} & \sqrt{0.5}\,e^{j\frac{4\pi}{3}} & \sqrt{0.5}\,e^{j\frac{5\pi}{3}} \end{bmatrix}.$$

28. A non-transitory computer program distribution medium readable by a computer and encoding a computer program of instructions for executing a computer process for data transmission, the process comprising:
receiving, by a transmitter, information on at least one precoding weight or vector in at least one codebook, wherein the at least one codebook comprises antenna selection weights, equal power weights having different transmission phases and orthogonal beam weight pairs; and
applying the at least one precoding weight or vector in signal pre-coding for transmission.

29. The non-transitory computer program distribution medium of claim 28, the distribution medium including at least one of the following media: a computer readable medium, a program storage medium, a record medium, a computer readable memory, a computer readable software distribution package, and a computer readable compressed software package.

30. The non-transitory computer program distribution medium of claim 28, wherein the codebook comprises the following weights:

$$\begin{bmatrix} 1 & 0 & \sqrt{0.5} & \sqrt{0.5} & \sqrt{0.5} & \sqrt{0.5} & \sqrt{0.5} & \sqrt{0.5} \\ 0 & 1 & \sqrt{0.5}\,e^{j0} & \sqrt{0.5}\,e^{j\frac{\pi}{3}} & \sqrt{0.5}\,e^{j\frac{2\pi}{3}} & \sqrt{0.5}\,e^{j\pi} & \sqrt{0.5}\,e^{j\frac{4\pi}{3}} & \sqrt{0.5}\,e^{j\frac{5\pi}{3}} \end{bmatrix}.$$

* * * * *

UNITED STATES PATENT AND TRADEMARK OFFICE
CERTIFICATE OF CORRECTION

PATENT NO.         : 8,396,158 B2
APPLICATION NO.    : 11/486856
DATED              : March 12, 2013
INVENTOR(S)        : Hugl et al.

Page 1 of 1

It is certified that error appears in the above-identified patent and that said Letters Patent is hereby corrected as shown below:

In the Specification

Column 10,
Lines 62 and 63, "preceding" should read --precoding--.

Column 11,
Line 17, "is form" should read --is of form--;
Line 60, "preceding" should read --precoding--.

Column 12,
Lines 8, 37, 42, 52, 55, "preceding" should read --precoding--.

Column 13,
Lines 28, 29, and 42, "preceding" should read --precoding--.

Signed and Sealed this
Twenty-fourth Day of September, 2013

Teresa Stanek Rea
*Deputy Director of the United States Patent and Trademark Office*